Sept. 8, 1970   J. A. MACKEN   3,527,532
DIGITAL OPTICAL FREQUENCY SHIFTER
Filed July 3, 1967   3 Sheets-Sheet 1

*INVENTOR.*
JOHN A. MACKEN
BY
ATTORNEY

INVENTOR.
JOHN A. MACKEN
BY
ATTORNEY

United States Patent Office 3,527,532
Patented Sept. 8, 1970

3,527,532
DIGITAL OPTICAL FREQUENCY SHIFTER
John A. Macken, Orange, Calif., assignor to North American Rockwell Corporation, a corporation of Delaware
Filed July 3, 1967, Ser. No. 650,943
Int. Cl. G01c 3/08; G02f 1/26; H01s 3/10
U.S. Cl. 356—4
6 Claims

ABSTRACT OF THE DISCLOSURE

The frequency of a beam of light is shifted in a stepwise manner by transmitting the beam of light serially through a plurality of rotating half-wave plates or electro-optic crystals which simulate rotating halfwave plates. A stepwise addition or substraction of frequencies in increments determined by the rotation rate of the half-wave plates results.

BACKGROUND OF THE INVENTION

Field of the invention

The present invention relates to an optical frequency shifter and, more particularly, to a method and means for shifting, in a stepwise or digital manner, the frequency of a beam of light over a wide frequency range.

Description of the prior art

It is often necessary or desirable to shift the frequency of a beam of light over a wide frequency range. For example, ever since the discovery of the gas laser, it has been proposed to use the high power properties thereof to construct a laser radar. A convenient technique for constructing a laser radar system is to compare the returning optical beam, shifted in frequency by the moving target in accordance with the well known Doppler effect, with the emitted beam by mixing them together and looking at the beat frequency. A problem exists, however, in using an optical laser Doppler radar over a large range of velocities such as would occur for a high speed jet aircraft, a missile, or a statellite. For example, if a 10.6 micron $CO_2$ gas laser is used, the radar frequency is $3 \times 10^{13}$ Hz. and the Doppler coefficient is 61 kHz./ft./sec. Anticipated targets may have relative velocities anywhere between a fraction of a ft./sec. and approximately ±20,000 ft./sec. Heterodyne detection of the return beam with a portion of the emitted beam would generate a Doppler signal between a few kHz. and 1.5 gHz. Such a high frequency signal exceeds the bandwidth of available detectors. As a result, it becomes necessary to reduce the detected signal to a more manageable value by shifting the frequency of that portion of the laser beam used for a heterodyning reference to a value close to the frequency of the return beam. For such a scheme to be practical, the reference beam must be shifted by a precisely known amount and selection of the frequency shift must be made very rapidly so that unacceptable time delays are not introduced into the laser radar system.

Many methods for shifting the frequency of a beam of light have been proposed. In order to be of extensive use, the frequency shifter must be capable of operation over a wide frequency range from a few Hz. to several gHz. This is clearly not obtainable with mechanical methods. One promising method of frequency shifting utilizes materials which exhibit an electro-optic effect, either the Pockels effect or the Kerr effect. However, practical problems arise when one attempts to operate these crystals over a wide range of frequencies. In order to cause an electro-optic crystal to modulate the frequency of a light beam incident thereon, it becomes necessary to drive the crystal with sinusoidal voltages. Although it is relatively simple to construct an electrical circuit that can resonate at one frequency and put out a large voltage swing, it is much more difficult to build electrical circuits that can generate all frequencies in the range of interest so that the crystal can be tuned continuously. The problem is further intensified by the fact that the size and construction of an electro-optic crystal changes with the frequency of operation so that it becomes much more difficult to operate the crystal over a large range than is possible at a single frequency.

SUMMARY OF THE INVENTION

According to the present invention, a unique approach to the problem of shifting the frequency of a beam of light over a wide range is formulated. Frequency shifting is accomplished by means of a set of discrete frequencies which are digitally selectable. When applied to a laser radar, frequency shifting of the local oscillator in this manner not only overcomes the detector bandwidth problem, but also resolves the velocity polarity ambiguity. Since the frequency shift can be made either up or down, the size of the frequency increments may be made as large as the bandwidth of the detector, and the detector employed to extrapolate between the steps provided by the frequency shifter.

The operation of the present invention is based on the fact that plane polarized light, when transmitted through a rotating half-wave plate, will be converted into two counter-rotating beams, one shifted up in frequency and the other shifted down, the rotating half-wave plate operating as an optical mixer to add and substract the frequency of rotation of the half-wave plate to the frequency of the incident light beam. If a second rotating half-wave plate is placed in series with the first, and if the second half-wave plate is rotated in the same direction and at the same rotation rate as the first, the frequency shifts provided by each will cancel out. However, if the second half-wave plate is rotated in the opposite direction as the first and at the same rate, the frequency of the light beam will be shifted in the same direction as that accomplished by the first half-wave plate and the total frequency shift will be twice that provided by the first half-wave plate. In other words, by multiplying the number of rotating half-wave plates placed in series, there may be a stepwise addition or substraction of frequencies in increments determined by the rotation rate of the half-wave plates. In this manner, each half-wave plate will rotate at only one frequency thereby simplifying and making practical the electronics necessary for driving. In addition, by using a plurality of serially disposed half-wave plates, a much greater total frequency shift may be achieved than is possible with a single half-wave plate. Finally, as will become clearer hereinafter, this basic technique can also be used to obtain a plurality of amplitude modulated signals.

OBJECTS

It is, therefore, an object of the present invention to provide an optical frequency shifter.

It is a further object of the present invention to provide a method and means for shifting, in a stepwise manner, the frequency of a beam of light.

It is a still further object of the present invention to provide a method and means for shifting the frequency of a beam of light over a wide frequency range.

It is another object of the present invention to provide an optical frequency shifter which employs a plurality of series disposed rotating half-wave plates.

It is still another object of the present invention to provide a method and means for shifting the frequency of a beam of light by additively combining the frequency shifts provided by a plurality of optical mixes.

Another object of the present invention is to provide a method and means for shifting the frequency of a beam of light by additively combining the frequency shifts provided by a plurality of serially disposed electrooptical crystals.

Still another object of the present invention is the provision of a novel electro-optic frequency shifter.

An additional object of the present invention is to provide a method and means for amplitude modulating a beam of light.

A further object of the present invention is the provision of a novel laser radar system.

Still other objects, features, and attendant advantages of the present invention will become apparent to those skilled in the art from a reading of the following detailed description of several embodiments constructed in accordance therewith, taken in conjunction with the accompanying drawings wherein:

DESCRIPTION OF THE PREFERRED EMBODIMENTS

Figure 1:
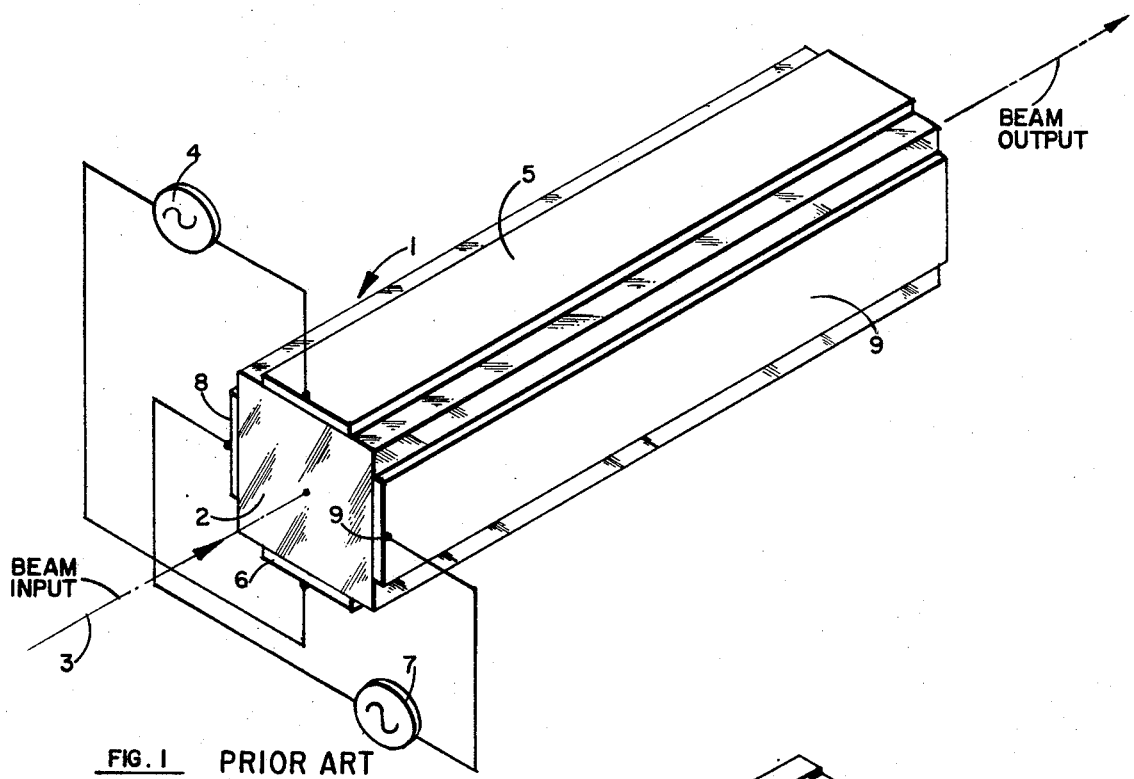
FIG. 1 is a schematic representation of a prior art frequency shifting optical mixer using electrodes on opposite faces.

For the purpose of this discussion, reference will be made to rotating half-wave plates. However, it is to be understood that all such references are not limited to the mechanical rotation of a device which produces a half-wave retardation between two mutually perpendicular plane polarized beams of light, but include the simulation of a rotating half-wave plate by the application of electric fields to a stationary electro-optic crystal so as to produce the same birefringent rotation characteristic of a rotating half-wave plate.

The principle of frequency shifting employed in the present invention makes use of the polarization properties of light and electro-optic crystals. Plane polarized light can be thought of as consisting of two superimposed beams of counter-rotating circularly polarized light, both rotating at the same frequency. In addition, a beam of plane polarized light which has its plane of polarization slowly rotating can be thought of as consisting of two superimposed beams of counter-rotating circularly polarized light which are rotating at slightly different frequencies. The difference in the frequencies of rotation is equal to the rotation rate of the rotating plane polarized light beam.

If a beam of plane polarized light which has a stationary plane of polarization is passed through a rotating half-wave plate, there emerges a rotating plane polarized beam. From the above analysis, it can be seen that a frequency shift must have taken place. Actually, the rotational frequency of the rotating half-wave plate has been mixed with the light beam and one circularly polarized component has been shifted up in frequency and the other component has been shifted down in frequency.

If the rotating plane polarized beam of light is now passed through a second half-wave plate which is rotating at the same rate and in the same direction as the first half-wave plate, the rotation of the plane polarized light beam will be cancelled and the emergent beam will be non-rotating plane polarized light. Under these circumstances, the frequency shifts provided by the two rotating half-wave plates have been subtracted. However, if the second half-wave plate is rotated in the opposite direction as the first half-wave plate, there is an additive effect on the rotation rate of the plane polarized light beam and the emergent beam of light will be rotating at a rate which is the sum of the rates provided by the individual half-wave plates.

The concept that rotating half-wave plates may be placed in series to produce additive or subtractive effects presents enumerable possibilities. If it is desired to obtain an amplitude modulated beam of light which is modulated at a higher frequency than is possible with a particular modulator, it would be possible to obtain the high frequency modulation by placing several counter-rotating half-wave plates in series. If a beam of plane polarized light is applied serially to the several plates and then through a linear polarizer, the resultant light beam is amplitude modulated at a frequency which is four times the sum of the effective rotation rates of the rotating half-wave plates.

If it is desired to obtain a frequency shifted beam of light, the frequency shifted circularly polarized components may be separated by passing the rotating plane polarized light beam through a quarter-wave plate and then through a plane polarizer. By rotating the plane polarizer in the proper direction and at the proper speed, either solely the component which is shifted up in frequency or solely the component which is shifted down in frequency or solely a combination of the two components which is a signal amplitude modulated at the beat frequency therebetween, may be obtained.

Another possible approach to obtaining a frequency shifted light beam is to start with circularly polarized light instead of linearly polarized light. Whereas passing linearly polarized light through a rotating halfwave plate produces two counter-rotating circularly polarized components, one shifted up in frequency and the other shifted down in frequency, passing circularly polarized light through a rotating half-wave plate produces only one frequency shifted component which is either shifted up or down in frequency. Thus, if a circularly polarized light beam of frequency $\omega$ is passed through a half-wave plate which is capable of rotation at an angular rate of $\pm\omega_1$ or 0, three output frequencies are possible, consisting of: (1) a zero frequency shift when the half-wave plate is not rotating ($\omega_1=0$); (2) an increased frequency ($\omega+2\omega_1$) when the plate rotates at $\omega_1$; and (3) a decreased frequency ($\omega-2\omega_1$) with the opposite sense of circular polarization when the plate rotates at $\omega_1$. In other words, a digital frequency shift is available in the amount of $\pm 2\omega_1$ with one rotating half-wave plate.

As stated previously, if two rotating half-wave plates are placed in series with each other, and if they are rotated in the same direction and at the same rotation rate, the frequency shift provided by each will cancel out. However, if the second plate is rotated in the opposite sense as the first and at the same rate, the output will be shifted by $\pm 4\omega_1$ since the shift will now be additive.

According to the present invention, maximum advantage can be taken of this additive effect by establishing a trinary system in which the rotation frequency of the second half-wave plate is three times that of the first half-wave plate. In this manner, a digital frequency shift is permitted with up to $3^2=9$ steps by various combinations of rotation rates. In a trinary system, each half-wave plate has three possible rotations allowed it. The first plate is allowed to rotate at either $\pm\omega_1$ or 0 and the second plate is allowed to rotate at $\pm 3\omega_1$ or 0. Thus, any given frequency shift can be obtained from $-8\omega_1$ through 0 to $+8\omega_1$. The total shift is given by $2(\omega_1-\omega_2)$, where $\omega_1$ is the rotation rate of the first half-wave plate, $\omega_2$ is the rotation rate of the second half-wave plate, and where $\omega_2$ can be positive, negative or zero relative to $\omega_1$. The combinations required to get a desired frequency are given by the table on following page.

| Frequency shift | Rotation of plate 1 $\omega_1$ | Rotation of plate 2 $3\omega_1$ |
|---|---|---|
| 0 | 0 | 0 |
| $\pm 2\omega_1$ | $\pm \omega_1$ | 0 |
| $\pm 4\omega_1$ | $\pm \omega_1$ | $\pm 3\omega_1$ (both plates rotating in same direction). |
| $\pm 6\omega_1$ | 0 | $\pm 3\omega_1$ |
| $\pm 8\omega_1$ | $\pm \omega_1$ | $\pm 3\omega_1$ (both plates rotating in opposite direction). |

This frequency offset technique can obviously be extended to three or more rotating half-wave plates. If a total number of five plates are used, these results $3^5=243$ frequency steps, comprising 121 frequencies shifted up, the same number shifted down, plus a zero shift. In such a five plate system, if the first half-wave plate is rotated electronically at a 20 mHz. rate, the total frequency shift up would be $20 \times 121 = 2420$ mHz. in steps of 20 mHz. each. Thus, if such a frequency shifter were used in a Doppler radar system, a receiver with a 20 mHz. bandwidth could be used to cover a Doppler velocity shift as great as 2,420 mHz.

In order to be of extensive use, the rotation rate of the half-wave plates should be in the range of several mHz. This is clearly not obtainable with mechanical methods. However, by using electro-optic crystals in which the fast and slow axes are directly related to an applied electric field, a high frequency of rotation can be obtained. Therefore, any of the materials which exhibit either the Pockels effect or the Kerr effect can be used. These crystals, like their mechanical counterpart the rotating half-wave plate, operate as optical mixers in that the crystal adds and/or subtracts the frequency of the applied electric field to the frequency of the light beam passing through the crystal.

Referring now to the drawings and, more particularly, to FIG. 1 thereof, there is shown a configuration for a frequency shifting optical mixer which uses an electro-optic crystal and electrodes on opposite faces thereof. An electro-optic crystal 1 having 3-fold axis of symmetry is cut in the form of a rectangular parallelepiped so that a beam of light incident on face 2 may travel along the axis of symmetry 3 and so that electric fields may be applied normal to this axis. In FIG. 1, the fast and slow electro-optic axes are rotated by applying a first sinusoidal voltage from a first high frequency generator 4 to a first pair of electrodes 5 and 6 and a second sinusoidal voltage from a second high frequency generator 7 to a second pair of electrodes 8 and 9. Electrodes 5, 6, 8 and 9 are spaced at 90° intervals around electro-optic crystal 1 as shown in FIG. 1. The signals from generators 4 and 7 are equal in frequency and essentially 90° out of phase. The electric field created by generators 4 and 7 causes crystal 1 to be birefringent with the direction of the optic axes being determined by the direction of the electric field with respect to the crystal. As the electric field in crystal 1 rotates, the electro-optic axes will also rotate. Thus, crystal 1 operates as an optical mixer with the advantage of being especially adapted for high frequency operation, the limiting factors being the available high frequency generators and the frequency limit of the electro-optic crystal. If a Kerr effect material is used for crystal 1, the light beam will be frequency shifted by an amount which is twice the frequency of the signals from generators 4 and 7. However, if a Pockels effect material is used, the light beam will be frequency shifted by an amount which is equal to the frequency of the signals from generators 4 and 7. A fuller explanation of the operation of electro-optic crystals as frequency shifting optical mixers may be obtained by reference to an article entitled "Electro-Optic Light Modulation With Cubic Crystals" by C. F. Buhrer et al., Applied Optics, August 1963, vol. 2, No. 8, pp. 839–846.

One problem encountered with the configuration shown in FIG. 1 is the field fringing effect in the corner regions of crystals 1. If plates 5, 6, 8 and 9 are made to cover nearly the entire sides of crystal 1, the electric fields at the corners get very large. On the other hand, if plates 5, 6, 8 and 9 are reduced, the useful volume of the device will be decreased. This may have the effect of decreasing the useful aperture of the device to approximately one-quarter of the total cross-section of crystal 1. This will require a larger crystal and more driving voltage.

Figure 2:
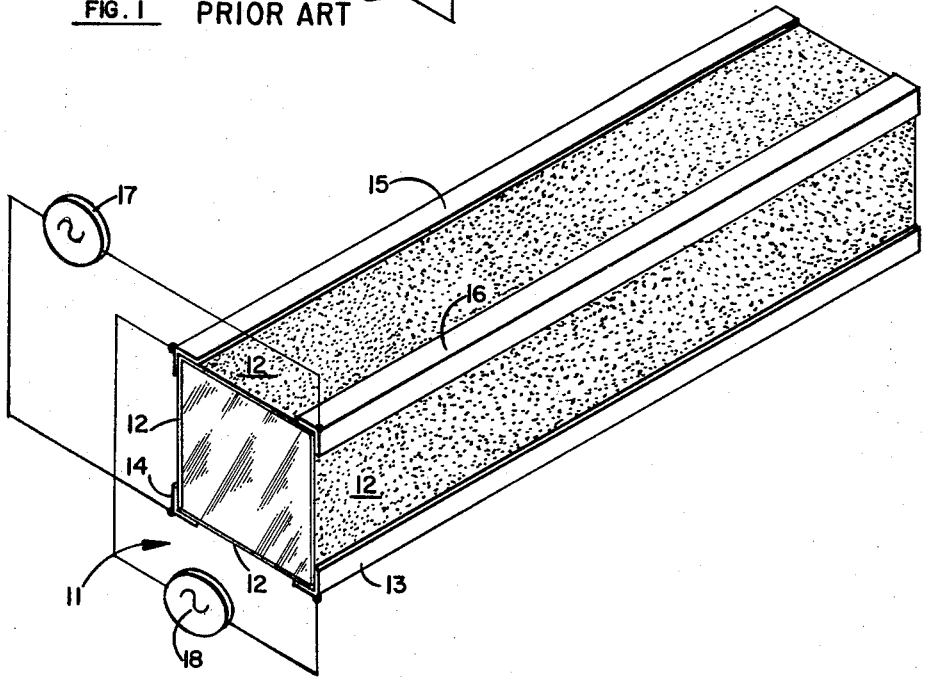
FIG. 2 is a schematic representation of an optical mixer constructed in accordance with the present invention which eliminates the field fringing effect encountered with the optical mixer of FIG. 1.

Referring now to FIG. 2, there is shown an alternative design for an optical mixer which substantially eliminates the field fringing problem. A crystal 11 is covered on four sides thereof with a high resistance film 12 such as vapor-deposited indium. A plurality of low resistance conducting strips 13–16 are then laid down along each corner of crystal 11 so as to make electrical contact with the high resistance film along the length of the edges. A first high frequency generator 17 is coupled via a pair of leads and high conductivity contacts to opposite conducting strips 14 and 16. Similarly, a second high frequency generator 18 is connected to opposite conducting strips 13 and 15. As was the case in the embodiment of FIG. 1, generators 17 and 18 generate signals which are equal in frequency but 90° out of phase. As electrodes 13–16 are driven by generators 17 and 18, high resistance film 12 provides a linear voltage drop between the corners of crystal 11 which exactly compensates for the distances variation which previously caused non-uniform electric fields. In this manner, the field fringing effect is substantially eliminated. Some power will, of course, be dissipated in these resistance films. However, any heating problems this may cause can be eliminated by properly heat sinking crystal 11. With a configuration such as shown in FIG. 2, the fact that the whole aperture can be used reduces the width of crystal 11, thus reducing the required voltages from generators 17 and 18.

Figure 3:
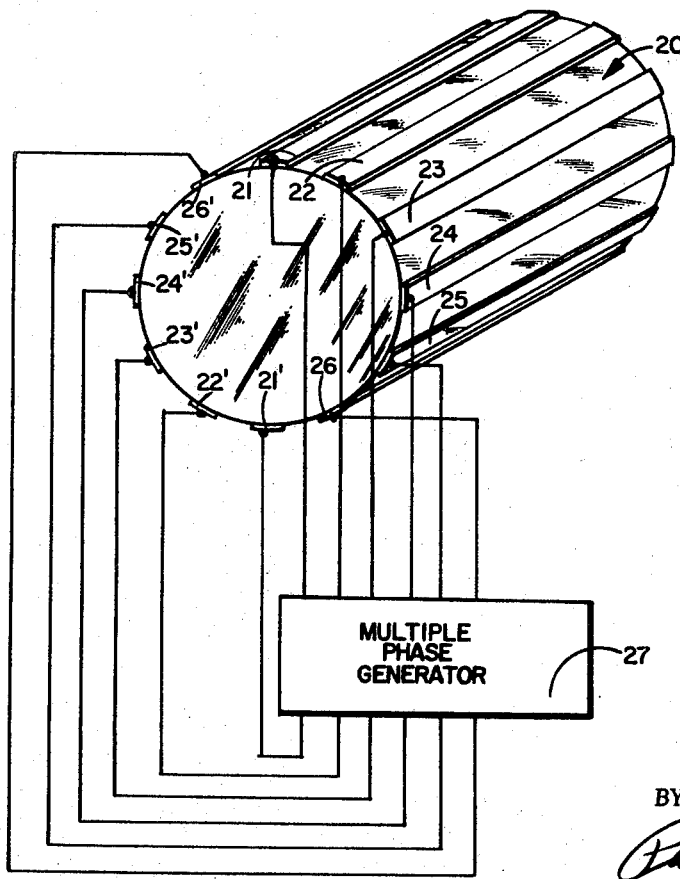
FIG. 3 is a schematic representation of a novel optical mixer operating with a multiple phase voltage source.

Referring now to FIG. 3, there is shown another embodiment of an electro-optic mixer which also eliminates the field fringing effect of the embodiment of FIG. 1 and, in addition, eliminates the dissipative elements of the embodiment of FIG. 2. The embodiment of FIG. 3 is a multiple phase configuration which includes a cylindrical electro-optic crystal 20 having a plurality of electrodes 21–26 and 21'–26' spaced equi-distantly along the surface thereof and a multiple phase generator 27. FIG. 3 illustrates a six-phase system in which the voltage applied to each electrode is the same with the exception of a 30° phase shift between the voltages applied to consecutive electrodes. If $n=$ the number of electrodes, it can be shown that the E field is constant across the face of crystal 20 for the case where $n=\infty$ and the width of each electrode is zero. Even though this is unobtainable, it has been found that for $n=6$, the electric field is quite uniform.

Figure 4:
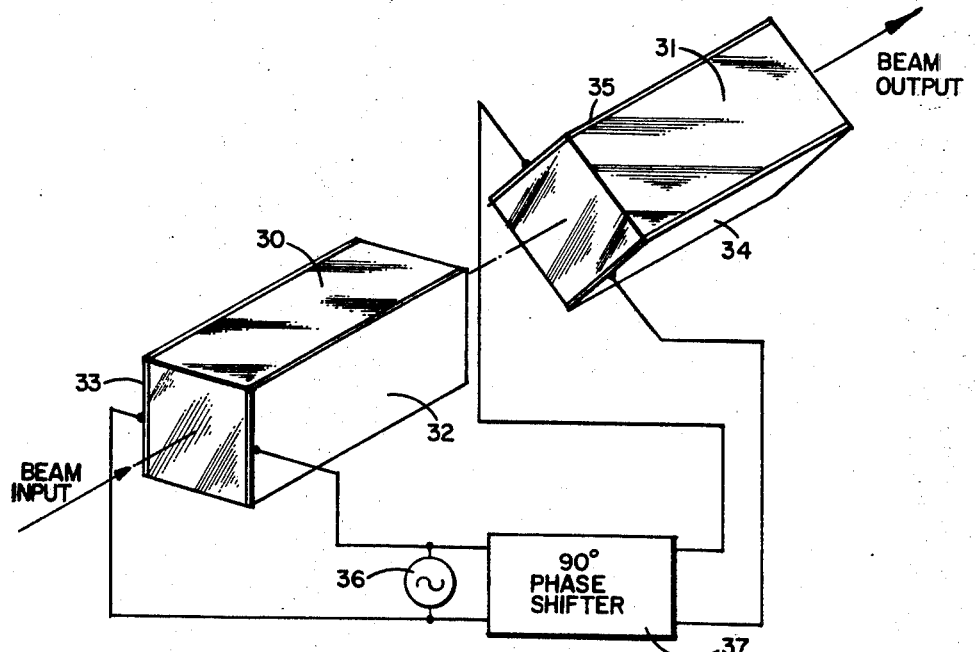
FIG. 4 is a schematic representation of another prior art frequency shifting optical mixer for use with the present invention.

Referring now to FIG. 4, there is shown still another configuration for a frequency shifting optical mixer which can be made to simulate a rotating half-wave plate. The embodiment of FIG. 4 consists of two electro-optic crystals 30 and 31 of the same length and crystalographic orientation in series. Crystals 30 and 31 are rectangular in shape and each has a pair of electrodes on opposite faces thereof as would be the case for a transverse electro-optic effect modulator. More specifically, crystal 30 has located thereon a pair of electrodes 32 and 33 on opposite faces thereof, and crystal 31 has a pair of electrodes 34 and 35 on opposite faces thereof. Crystals 30 and 31 are located in series with crystal 31 rotated on its axis at a 45° angle with respect to crystal 30. A high frequency generator 36 is provided to supply equal and opposite sinusoidal voltages to plates 32 and 33. The output of frequency generator 36 is also applied to a 90° phase shifter 37 whose output is applied to electrodes 34 and 35. In this manner, crystals 30 and 31 are driven 90° out of phase with each other. The combination of this type of drive together with the rotation of crystal 31 with respect to crystal 30, has been shown to modulate an incident circularly polarized beam of light at a rate dependent upon the frequency of the signal from generator 36. In this manner, the configuration of FIG. 4 simulates a rotating half-wave plate.

In the embodiment of FIG. 4, the fringing electric fields have been eliminated, thereby simplifying construction and frequency shifter design. In addition, the embodiment of FIG. 4 permits the use of other classes of crystals which would not work in the embodiments of FIGS. 1, 2 and 3. For example, crystals which do not have a 3-fold axis of symmetry can only be used in the series crystal design of FIG. 4. The obvious advantage of the frequency shifters of FIGS. 1–3, that use a rotating electric field, is that they require only a single crystal, and, in the ideal case, would have a total path length only half as long as the series crystal configuration of FIG. 4.

Figure 5:
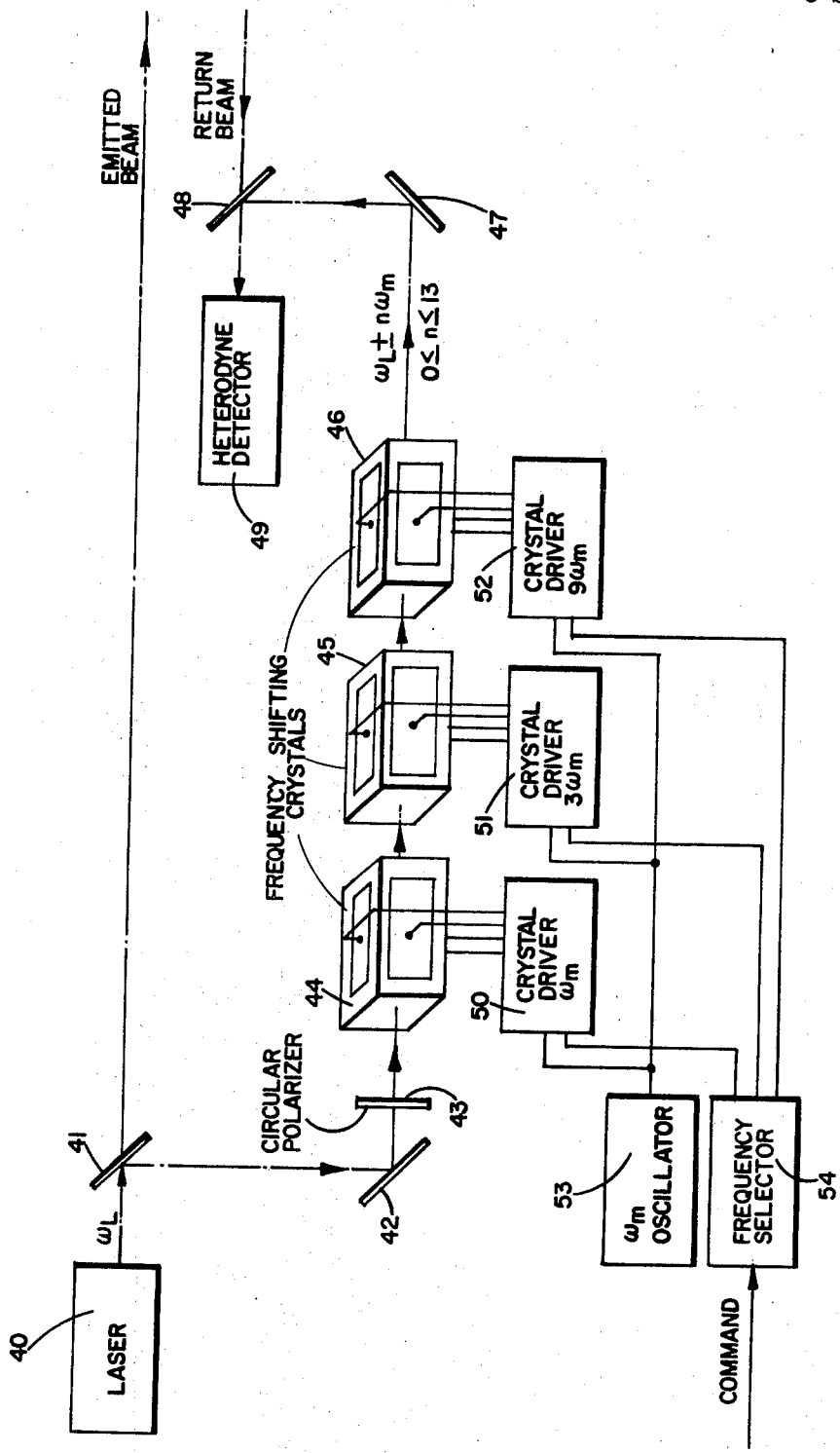
FIG. 5 is a schematic representation, partially in block diagram form, showing the use of the present invention in a laser radar.

Referring now to FIG. 5, there is shown a block diagram of a laser radar employing the frequency shifting technique of the present invention. The laser radar of FIG. 5 consists of a laser 40 for generating a beam of light of frequency $\omega_L$. The beam of light is transmitted through a partially reflecting mirror 41 in the direction of a target to be located. Partially reflecting mirror 41 is operative to reflect a portion of the transmitted beam towards a fully reflecting mirror 42 and thence via a circular polarizer 43 to the frequency shifting crystals.

If linearly polarized light is applied to the frequency shifting crystals, a portion of the beam will be shifted up in frequency whereas a portion of the beam will be shifted down in frequency. On the other hand, if circularly polarized light is used, there is 100% conversion of the light to a higher frequency which is more efficient for the present purposes. Therefore, in order to obtain a single sideband suppressed carrier frequency shift, the crystals should receive an input of circularly polarized light. Since the output of a Brewster angle $CO_2$ laser is generally plane polarized, polarizer 43, which may be a quarter-wave plate or a Fresnel Rhomb, is provided to convert the plane polarized light to circularly polarized light.

After passing through circular polarizer 43, the portion of the transmitted beam reflected by mirror 41 is applied serially to frequency shifting crystals 44, 45 and 46, it being understood that three crystals are shown solely for purposes of explanation. After exiting from crystal 46, the light is reflected by a totally reflecting mirror 47 and a partially reflecting mirror 48 to a heterodyne detector 49. The portion of the emitted beam which is reflected by the target is applied via partially reflecting mirror 48 to detector 49 so as to be colinear with the local oscillator beam. In this manner, detector 49 is operative to sense the beat frequency between the return beam and the local oscillator beam. Frequency shifting crystals 44, 45 and 46 may be any of the types described with respect to FIGS. 1 through 4 and are driven by crystal drivers 50, 51 and 52, respectively. Crystal drivers 50–52 are controlled by an oscillator 53 coupled to the input of each driver. Each of crystal drivers 50–52 may contain, for example, a phase splitter, a high voltage generator, and on/off and polarity control circuitry. A single reference oscillator 53 is preferred because it is desirable for the modulating frequency of each succeeding crystal to be the third harmonic of the preceding one. By using a single oscillator 53, operating at frequency $\omega_m$, it is insured that driver 50 will operate at $\omega_m$, that driver 51 will operate at $3\omega_m$, and that driver 52 will operate at $9\omega_m$. A frequency selector 54 responsive to external command signals is also connected to control crystal drivers 50–52. Frequency selector 54 contains logic for commanding on/off and polarity of crystal drivers 50–52 so that the desired frequency shift may be obtained. Frequency selector 54 may be commanded by an external source or it may be stepped through the frequencies sequentially until detector 49 detects a beat signal.

It can, therefore, be seen that in accordance with the present invention, a unique approach to the problem of constructing a wide range frequency shifter is provided.

This is accomplished by using a plurality of series connected frequency shifting crystals so as to add the frequency shifts provided by each. It will be obvious that several advantages accrue from the use of frequency addition. The first of these advantages is that higher frequencies are possible. The fact that N modulators can be used in series gives a maximum frequency of N times the maximum frequency of the individual modulators. A second advantage results from the proper choice of frequency for each modulator so as to provide coverage of a wide range of possible frequency offsets in digital frequency jumps. For example, if the bandwidth of detector 49 in FIG. 5 is $10^8$ Hz., it is possible with just three modulators, as shown in FIG. 5, for detector 49 to detect any Doppler frequency shift from $-1.4$ gHz. to $+1.4$ gHz. This requires that modulator 44 be driven with a frequency of $10^8$ Hz., modulator 45 be driven with a frequency of $3 \times 10^8$ Hz., and modulator 46 be driven with a frequency of $9 \times 10^8$ Hz. In addition, modulators 44–46 must be capable of being turned off or reversing the direction of rotation of the electric fields. This may be accomplished most simply by breaking the circuits or reversing the leads, respectively. Using this technique, one can obtain any one of $3^N$ different frequencies, where N is the number of modulators.

One additional feature of this technique is that there is no Doppler frequency ambiguity because in searching for the beat frequency, it is known whether a positive or negative frequency shift is obtained. It should be pointed out, however, that when searching for a beat, it is necessary to successively move up or down in frequency so that the exact Doppler shift frequency can be deduced when a beat is found. If a random frequency search is carried on, when a beat is detected, it is necessary to shift to the next adjacent frequency to determine whether the beat is on the positive or negative side of the frequency shifted frequency.

One additional advantage of the present technique for additively combining frequency shifts is that it results in simpler electronics. The problem with electro-optic modulators has always been obtaining a high voltage at high frequencies with a usable bandwidth. However, with the present invention, operation is most useful when each modulator is driven at just one frequency. Therefore, the bandwidth requirements have been eliminated and high Q resonant circuits can be used. This diminishes the electrical problems roughly proportionally to the Q of the circuit. Even the capacitance of the modulator can now be used to advantage as part of the resonant circuit. As a result, the use of additive frequency shifting permits detectors of limited bandwidth to be used to detect Doppler frequencies which are much higher than the bandwidth of the detector.

While the invention has been described with respect to several physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scope of the appende embodiments, but only by the scope of the appended claims.

I claim:

1. In a laser radar system wherein a beam of light is transmitted in the direction of a target and wherein a portion of said transmitted beam is optically mixed with the light which is reflected by said target, said reflected light being shifted in frequency by the motion of said target, means for shifting the frequency of said portion of said transmitted beam so that said portion has approximately the same frequency as said reflected light, said means comprising:

a plurality of optical mixers, each having an input for shifting the frequency of a light beam passing therethrough, said portion being applied serially through said optical mixer wherein each optical mixer is operative to shift the frequency of said portion by a fixed amount which is three times the frequency shift of the previous mixer and further comprising:

means for controlling each of said mixers so as to selectively cause each mixer to shift the frequency of said beam of light up, down or not at all whereby said beam of light may be frequency shifted in steps equal to the frequency shift of the first mixer and through a total number of steps equal to $3^n$ where $n$ equals the number of optical mixers.

2. Means for shifting the frequency of a beam of light comprising::

a plurality of optical mixers, each having an input, and each having a half-wave plate wherein each successive half-wave plate rotates at a fixed speed which is three times of the previous half-wave plate, said mixer shifting the frequency of a light beam passing therethrough proportional to the frequency of a signal applied to said input, said beam of light being applied serially through said optical mixers whereby the freqeuncy shifts provided by each of said mixers may be combined; and means for controlling each of said half-wave plates so as to selectively cause each plate to rotate in first or second opposite directions or to remain stationary whereby said beam of light may be frequency shifted in steps equal to twice the speed of rotation of the first half-wave plate and through a total number of steps equal to $3^n$ equals the number of half-wave plates.

3. Means for shifting the frequency of a beam of light comprising:

a plurality of electro-optic crystals, each having an input;

driver means for applying a voltage to each of said crystals to generate a rotating electric field therein, said crystals shifting the frequency of said beam of light by an amount which is proportional to the speed of rotation of said rotating electric field, said beam of light being applied serially through said optical crystals to shift the frequency of said beam of light by a fixed amount which is three times the frequency shift of the previous crystal; and means for controlling each of said driver means so as to selectively cause each crystal to shift the frequency of said beam of light up, down, or not at all, whereby said beam of light may be frequency shifted in steps equal to the frequency shift of the first crystal and through a total number of steps equal to $3^n$ where $n$ equals the number of crystals.

4. Means for shifting the frequency of a beam of light comprising:

a plurality of optical mixers, each having an input, said beam of light being applied serially through said optical mixers wherein each optical mixer is operative to shift the frequency of said beam of light by a fixed amount which is three times the frequency shift of the previous optical mixer and further comprising:

means for controlling each of said optical mixers so as to selectively cause each mixer to shift the frequency o fsaid beam of light up, down, or not at all, whereby said beam of light may be frequency shifted in steps equal to $3^n$ where $n$ equals the number of optical mixers.

5. Means for shifting the frequency of a beam of light, said means comprising:

a first optical mixer disposed in the path of said beam of light for selectively shifting the frequency of said beam by $0$, $+\omega_1$, or $-\omega_1$ Hz.; and a second optical mixer disposed in the path of said beam and in series with said first optical mixer for selectively shifting the frequency of said frequency shifted beam by $0$, $+\omega_2$ or $-\omega_2$ Hz.; and further comprising:

means for controlling said first and second mixers so as to select the frequency shift provided by each.

6. The combination of claim 5 wherein $\omega_2 = 3\omega_1$ whereby frequency shifts from $-4\omega_1$ through $0$ to $+4\omega_1$ are permissible in steps equal to $\omega_1$.

References Cited

UNITED STATES PATENTS

| | | |
|---|---|---|
| 2,988,710 | 6/1961 | Carlson _____ 331—39 X |
| 3,150,363 | 9/1964 | Finvold. |
| 3,204,104 | 8/1965 | Baird et al. _____ 350—150 X |
| 3,256,443 | 6/1966 | Moore _____ 250—199 |
| 3,304,428 | 2/1967 | Peters. |
| 3,328,723 | 6/1967 | Giordmaine et al. __ 332—7.51 X |

FOREIGN PATENTS 1,018,867   2/1966   Great Britain.

OTHER REFERENCES

General Radio, A New Converter for Frequency Measurements to 500 mc., in General Radio Experimenter, vol. 36, No. 12, December 1962, pp. 3–6 relied upon.

RODNEY D. BENNETT, JR., Primary Examiner

D. C. KAUFMAN, Assistant Examiner

U.S. Cl. X.R.

250—199; 332—7.51; 350—150, 160